HERBICIDAL BENZAMIDES AND METHODS

Joseph W. Baker and John P. Chupp, Kirkwood, Mo., assignors to Monsanto Company, St. Louis, Mo., a corporation of Delaware
No Drawing. Filed Dec. 8, 1964, Ser. No. 416,882
10 Claims. (Cl. 71—118)

This application is a continuation-in-part of application Ser. No. 834,422, filed Aug. 18, 1959, now abandoned.

This invention relates to herbicidal compositions and to methods of inhibiting the growth of noxious vegetation employing N,N-substituted polyhalobenzamides as essential active ingredients.

Weeds may be broadly defined as undesirable plant growth. In certain places, for example, along railroad tracks, any vegetation thereon is considered a weed and complete prevention of the growth of all plants is desired. Of even greater importance is the selective control of weeds in agriculture, i.e., retardation or prevention of growth of weeds without injury to the crop. For example, grass or other plants growing within a corn field are regarded as weeds and they are difficult to remove, since corn is a member of the narrow-leaf family of plants, as are the grasses. Since the physiological structures of the members of the narrow-leaf family are very close, the problem of finding a chemical which has the desired specificity becomes increasingly difficult. Moreover, the selectivity of the chemical must be considered, not only with respect to the soil to which it is applied, but also to the effect of the chemical on adjacent crops which are sensitive to this chemical.

It is a primary object of this invention to provide a new and useful class of general herbicides and methods for their use. A further object of this invention is to provide methods of destroying grasses in the presence of certain broad-leaf plants. A still further object is to provide a method of destroying grasses in the presence of other narrow-leaf plants, such as corn. Other objects and advantages of the present invention will be apparent from the following description.

In accordance with this invention, it has been discovered that compounds of the following chemical structure posses unusual and valuable herbicidal activity:

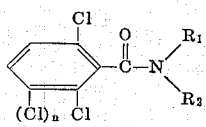

wherein $n$ is an integer of from 0 to 1, $R_1$ and $R_2$ are selected from the group consisting of unsaturated aliphatic hydrocarbon radicals and haloaliphatic radicals having up to six carbon atoms.

Examples of unsaturated aliphatic hydrocarbon radicals include the alkenyl radicals such as vinyl, allyl, crotyl, methallyl, n-pentenyl, n-hexenyl, etc.; and the akynyl radicals such as propargyl, 3-butynyl, etc. Examples of haloaliphatic radicals include the haloalkyl radicals such as chloromethyl, 2-chloroethyl, 3-chloropropyl, 3-fluoropropyl, 2,2-dichloropropyl, 2-iodopropyl, 6-bromohexyl, etc.; the haloalkenyl radicals such as 2-chloroallyl, 3-chlorocrotyl, 3-chloroallyl, 2,3-dichloroallyl, 3-choro-2-butenyl, 3-bromoallyl, etc.; the haloalkynyl radicals such as 4-bromo-2-butynyl, 5-chloro-2-pentynyl, 4-chloro-2-butynyl, 6-iodo-2-hexynyl, etc.

As illustrative of compounds which come within the scope of this invention there may be mentioned:

N,N-bis(2-chloropropyl) 2',6'-dichlorobenzamide
N,N-bis(2,2-dichloropropyl) 2',6'-dichlorobenzamide
N-2,2-dichloroethyl-N-2-chloroallyl 2',6-dichlorobenzamide
N,N-bis(6-bromohexyl) 2',6'-dichlorobenzamide
N,N-dipropargyl 2',6'-dichlorobenzamide
N-allyl-N-methallyl 2',6'-dichlorobenzamide
N,N-diallyl-2',3',6'-trichlorobenzamide
N,N-bis(2-bromoallyl) 2',3',6'-trichlorobenzamide
N,N-dibutynyl 2',3',6'-trichlorobenzamide
N-allyl-N-2-chloroallyl 2',3',6'-trichlorobenzamide
N-allyl-N-2,3-dibromopropyl 2',3',6'-trichlorobenzamide
N,N-bis(2-chloropropyl) 2',3',6'-trichlorobenzamide
N-crotyl-N-2-propynyl 2',6'-dichlorobenzamide
N-2-chloroallyl-N-methallyl 2',3',6-tribomobenzamide
N-3-butynyl-N-allyl 2',6'-dichlorobenzamide
N-methallyl-N-2,3-dichloroallyl 2',6'-dichlorobenzamide
N-allyl-N-4-chloro-2-butynyl 2',6'-dichlorobenzamide
N,N-dipropargyl 2',3',6'-trichlorobenzamide Included within the above broad class of compounds useful in the compositions and methods of this invention in a class of compounds which posses outstanding pre-emergence utility and are represented by the structure:

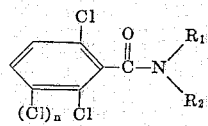

wherein $R_1$ and $R_2$ each represent an alkenyl or chloroalkenyl radical having up to four (4) carbon atoms and $n$ is an integer of from zero (0) to one (1). N,N-bis(2-chloroallyl)-2',3',6'-trichlorobenzamide is a particularly outstanding specie.

The N,N-substituted polyhalobenzamides of this invention may be prepared by numerous methods known to the art of chemical synthesis as are specifically disclosed and discussed in prior patents and in the literature. As for example, these compounds can be prepared by the reaction of a polyhalobenzoyl halide with the appropriate amine. This reaction can be carried out in solution in an organic solvent in the presence of a hydrogen halide acceptor or the reaction can be carried out in an aqueous media, e.g. in a dilute solution of sodium carbonate.

The active compound is, of course, applied in an amount sufficient to exert the desired herbicidal action. The amount of active compound present in the compositions as actually applied for preventing weeds, i.e., unwanted plants, will vary with the manner of application, the particular weeds for which the control is sought, the purpose for which the application is being made, and like variables. In general, the herbicidal compositions as applied will contain from about 1% to about 90% by weight of the N,N-substituted polyhalobenzamides.

Valuable herbicidal effects will be observed by applications of small amounts, for example as low as one-half pound of active compound per acre, as well as high concentrations, for example 100 pounds per acre. As a general rule, the selective activity on grasses is exhibited at lower rates of application, for example 2 to 10 pounds per acre. For general application and herbicidal effect on both grasses and dicotyledonous plants, it usually will be found necessary to use amounts in the range of 10 to 50 pounds per acre. Herbicidal compositions of the invention are prepared by admixing one or more of the N,N-substituted polyhalobenzamides defined heretofore in herbicidally effective amounts, with a herbicidal conditioning agent of the kind used and referred to in the art as a pest control adjuvant or modifier to provide formulations adapted for ready and efficient application to the soil using conventional applicator equipment.

The solid formulations, frequently referred to as "dusts" may contain in addition to the active ingredient, diluents or extenders, dispersing agents to prevent local high concentration and agents to facilitate distribution in soil or soil waters. Suitable solid diluents are those which render the compositions permanently dry and free-flowing. Thus hydroscopic materials are to be avoided unless the compositions also contain a separate substance to serve as an aid to flowability. Effective solid diluents preferably pulverulent or granular in form so as to be effective carriers for the active ingredient, are the natural clays such as china clays, the bentonites and the attapulgites; other minerals in a natural state, such as talc, pyrophyllite, quartz, diatomaceous earth, Fuller's earth, chalk, rock phosphate and sulfur; and the chemically modified minerals, such as the acid washed bentonite, precipitated calcium phosphate, precipitated calcium carbonate and colloidal silica. These diluents may represent a substantial portion, for example 50 to 98 percent by weight of the entire formulation as applied to the soil. More concentrated herbicides will require dilution by the user in order to properly condition the soil for the most effective usage. The concentrated solid herbicidal formulations can be used with less danger if they are mixed with the surface soil by means of a disk plow or harrow at the time of application.

The liquid compositions for herbicidal use may be solutions, or other liquid dispersions. The choice of a liquid medium will depend to some extent upon the physical properties of the active ingredient. The N,N-substituted polyhalobenzamides are, for the most part, insoluble in water and therefore aqueous formulations will necessarily be dispersions of minute drops or particles of the water-insoluble substances in suspension in an aqueous medium. The water-insoluble N,N-substituted polyhalobenzamides of this invention may first be dissolved in a suitable organic solvent and the organic solution of the active ingredient then incorporated in water to produce a heterogeneous dispersion of the active ingredient in water.

Many of the formulations are benefited by the incorporation of the organic solvents for the active components, such as the organic alcohols, ketones and hydrocarbons, for example isopropanol, benzene, acetone, methylethyl ketone, kerosene and chlorinated hydrocarbons. The proportions of such organic liquid additives will depend upon the solubility properties of the active ingredient and may require as little as 1 percent or as much as 80 percent or more in order to provide a uniformly distributed formulation which is capable of maintaining its distributed state during storage, use and application to the soil.

The surface-active dispersing agents employed can be of the anionic, cationic, or nonionic type and include, for example, sodium and potassium oleate, the amine salts of oleic acid such as morpholine and dimethylamine oleates, the sulfonates animal and vegetable oils such as sulfonated fish and castor oils, sulfonated petroleum oils, sulfonated acrylic hydrocarbons, sodium salt of lignin sulfonic acid (goulac), alkylnaphthalene sodium sulfonate, sodium salts of sulfonated condensation products of naphthalene and formaldehyde, sodium lauryl sulfate, disodium monolauryl phosphate, sorbitol laurate, pentaerythritol monostearate, glycerol monostearate, diglycol monostearate, diglycol oleate, polyethylene oxides, ethylene oxides condensation products with stearyl alcohol and octyl phenol, polyvinyl alcohols, salts, such as the acetate of polyamines from the reductive amination of ethylene/carbon monoxide polymers, laurylamine hydrochloride, laurylpyridinium bromine, stearyltrimethylammonium bromide, cetyldimethylbenzyl ammonium chloride, lauryl dimethylamine oxide and other simple and polymeric compositions having both hydrophilic and hydrophobic functions so as to enable the mixing of otherwise immiscible ingredients. Generally, the surface-active agents will represent only a minor portion of the formulation as used, for example, less than 15 percent and frequently as low as 0.05 percent by weight of the composition. Usually, concentrations of from 0.5 to 5 percent are found to be optimum.

A useful formulation of the herbicidal compositions may involve the solid or liquid concentrate of the active ingredient to which has been added formulation aids, one or more of the aforementioned herbicidal conditioning agents, so that the concentrates may be mixed with a suitable extender or diluent in the field at the time of use. Obviously for this purpose the dispersing or surface active agents will be present in larger concentrations so that upon dilution with water or a solid extender, compositions containing optimum proportions of dispersing agents and active ingredient will be prepared.

The herbicidal compositions are applied either as a spray or a dust to the locus or area to be protected from undesirable plant growth. Such application can be made directly upon the soil in advance of an anticipated weed infestation, as for example, in the form of a spray applied directly to the surface of the soil, or in the form of a dry powdered composition which can be dispersed in the surface soil. The phrase "applying to the soil," as used hereinafter in the specification and claims, shall be understood to refer to any method of applying the active ingredient to the soil for pre-emergence control. Regardless of the method of application employed, a readily flowable composition is required. Thus a critical aspect of this invention is the fluent carrier without which the optimum herbicidal effects cannot be achieved.

Both the solid and the liquid formulations above described are useful in the application of herbicides, because they facilitate the uniform distributing and aid in the inhibition of undesirable plants by maintaining the active ingredient in a form which enables its prompt assimilation by the plant and the efficient utilization of its phytotoxic properties. The described conditioning agents enable the proper use to achieve the desired herbicidal effects by an unskilled operator without elaborate equipment.

Fertilizer materials, other herbicidal and other pest control agents, such as fungicides and insecticides, can be included in the herbicidal compositions of the invention if desired.

The present invention is illustrated, but not limited by the following examples:

*Example 1.—Pre-emergence tests*

The relative value of several of the N,N-substituted polyhalobenzamides as pre-emergence herbicides is determined by planting in greenhouse flats, seeds of thirteen different plants, each representing a principal botanical type. A solution or suspension of the test compound is prepared by mixing 0.5 gm. of the compound with 25 cc. of acetone or some other suitable solvent. 4.1 cc. of this stock solution is diluted to 15 cc. with the solvent used and the full fifteen cc. is then sprayed over the entire area of a pre-planted pan (aluminum 9½" x 5¼" x 2¾", soil ¾" deep, seeds ⅜" deep). This amount of chemical corresponds to a rate of approximately 25 lbs. per acre.

After spraying, the pans are placed in ½" of water and allowed to absorb moisture through the perforated bottom until the soil surface is about one half-moist. The pans are then transferred to a wet sand bench in a greenhouse.

Fourteen days after application of the test chemical the results are observed and recorded. The number of plants of each species which germinated and grew are counted and such data are converted into herbicidal ratings, taking into account the germination and growth in the untreated plots. In the following tables of herbicidal evaluation data, these plants are represented by letters as follows:

A—Morning glory
B—Brome-cheat grass
C—Rye grass
D—Buckwheat
E—Radish-mustard
F—Sugar beet
G—Cotton
H—Corn
I—Foxtail grass
J—Barnyard grass
K—Crab grass
L—Field bindweed
M—Pigweed The relative value of each compound with respect to its herbicidal effect on the various plants is indicated by a number as follows:

0—No phytotoxicity  
1—Slight phytotoxicity  
2—Moderate phytotoxicity  
3—Severe phytotoxicity

TABLE A

| | A | B | C | D | E | F | G | H | I | J | K | L | M |
|---|---|---|---|---|---|---|---|---|---|---|---|---|---|
| N,N-bis(2-chloroallyl)2',3',6'-trichlorobenzamide | 3 | 3 | 3 | 3 | 3 | 3 | 3 | 3 | 3 | 3 | 3 | 3 | 3 |
| N,N-diallyl 2',3',6'-trichlorobenzamide | 0 | 3 | 3 | 0 | 2 | 3 | 1 | 0 | 3 | 3 | 3 | 0 | 3 |
| N,N-diallyl 2',6'-dichlorobenzamide | 1 | 3 | 3 | 2 | 1 | 3 | 2 | 2 | 3 | 3 | 3 | 1 | 3 |

When the N,N-substituted polyhalobenzamides are used at lower rates of application, their specificity with respect to grasses and certain broadleaf plants is more evident. The following data demonstrate their selective herbicidal utility:

TABLE B

| | Rate (lbs./acre) | A | B | C | D | E | F | G | H | I | J | K | L | M |
|---|---|---|---|---|---|---|---|---|---|---|---|---|---|---|
| N,N-diallyl 2',6'-dichlorobenzamide | 5 | 2 | 3 | 3 | 1 | 0 | 2 | 3 | 0 | 3 | 3 | 3 | 1 | 3 |
| | 1 | 0 | 3 | 3 | 0 | 1 | 0 | 0 | 1 | 0 | 3 | 2 | 0 | 1 |
| N,N-bis(2-chloroallyl)2',3',6'-trichlorobenzamide | 5 | 3 | 3 | 1 | 3 | 3 | 2 | 3 | 0 | 3 | 3 | 3 | 3 | 3 |
| | 1 | 3 | 3 | 0 | 1 | 1 | 2 | 1 | 0 | 3 | 1 | 1 | 3 | 3 |
| | 1/4 | 1 | 0 | 0 | 0 | 0 | 2 | 0 | 0 | 3 | 2 | 0 | 3 | 3 |
| | 1/8 | 0 | 0 | 0 | 0 | 0 | 0 | 0 | 0 | 0 | 0 | 0 | 2 | 2 |

The data in Table B demonstrates the outstanding herbicidal efficiency of the preferred compounds of this invention. These compounds are particularly useful in inhibiting the growth of the most prevalent lawn weeds, e.g. crabgrass, pigweed, lambsquarters (sugar beet family), foxtail grass and barnyard grass (water grass).

The herbicidal efficiency of the above compounds is surprising for related compounds possess little or no herbicidal activity. When tested as described above, at 25 lbs. per acre, a random group of such related compounds are found to possess little or no herbicidal activity. Some of the compounds tested are set forth below:

N-ethyl-N-phenyl-benzamide  
2',3',6'-trichlorobenzamide  
N,N-dicyclohexyl-benzamide  
Benzamide  
N-2-chloropropyl benzamide  
N,N-diallylbenzamide  
N,N-bis(2-cyanoethyl)2',3',6'-trichlorobenzamide 2',3',6'-trichlorobenzamide, for example, had zero ratings on all plants tested at the 25 lbs. per acre level.

Whereas, results similar to those obtained in Tables A and B above are obtained when the following N,N-substituted polyhalobenzamides are tested as above:

N,N-dimethallyl 2',3',6'-trichlorobenzamide  
N,N-dicrotyl 2',3',6'-trichlorobenzamide  
N,N-dibutenyl 2',3',6',-trichlorobenzamide  
N,N-dipropargyl 2',3',6'-trichlorobenzamide  
N-allyl-N-methallyl 2',3',6'-trichlorobenzamide  
N-allyl-N-propargyl 2',3',6'-trichlorobenzamide  
N-chloromethyl-N-2-chloroethyl 2',3',6' - trichlorobenzamide  
N-2-chloropropyl - N - propargyl 2',3',6' - trichlorobenzamide  
N,N-bis(2,2-dichloropropyl) 2',3',6-trichlorobenzamide  
N-2-chloroallyl-N-4-chloro-2-butenyl 2',3',6' - trichlorobenzamide  
N-allyl-N-n-pentenyl 2',3',6'-trichlorobenzamide  
N,N-bis(3-chloropropyl) 2',3',6'-trichlorobenzamide  
N,N-bis(2-bromoallyl) 2',3',6'-trichlorobenzamide  
N-2-chloroethyl-N-allyl 2',3',6'-trichlorobenzamide  
N-4-chloro-2-butynyl-N-allyl 2',3',6'-trichlorobenzamide  
N-3-bromo-2-hexenyl-N-allyl 2',3',6'-trichlorobenzamide  
N,N-dibutenyl 2',4',5'-trichlorobenzamide  
N,N-bis(2-bromopropyl) 2',3',6'-trichlorobenzamide  
N,N-dimethallyl 2',6'-dichlorobenzamide  
N-3-chloropropyl-N-2-propynyl 2',6'-dichlorobenzamide  
N,N-bis(2-chloroallyl) 2',6'-dichlorobenzamide  
N,N-dipropargyl 2',6'-dichlorobenzamide  
N,N-bis(2-chloroethyl) 2',6'-dichlorobenzamide  
N,N-bis(2-bromoethyl) 2',6'-dichlorobenzamide  
N,N-bis(2,3-dichloroallyl) 2',6'-dichlorobenzamide  
N,N-bis(2,2-dichloropropyl) 2',6'-dichlorobenzamide  
N,N-di-3-butynyl 2',6'-dichlorobenzamide  
N,N-di-2-pentynyl 2',6'-dichlorobenzamide Selective herbicidal activity with respect to several genera of grasses is illustrated by the data in the above tables. The botanical types of grasses which are effectively controlled by means of the N,N-substituted polyhalobenzamides of this invention, embrace a large number of undesirable plants, or weeds, frequently found in vegetable crops. This invention is not limited to the elimination of grasses in the presence of broadleaf plants, but also extends to the elimination of undesirable grasses in the presence of other narrow leaf plants, e.g. corn. In addition, certain undesirable broad-leafed plants, i.e. those in the same respective plant families as sugar beets, buckwheat and pigweed for example, may be effectively controlled while valuable broad-leafed plants in the same plant family as cotton, for example, are completely unaffected.

*Example 2.—Dust formulations*

The following compositions are adapted for direct application as dusts for the destruction or prevention of weeds using conventional applicator equipment. The dusts are mixed by blending or mixing the ingredients and grading the mix to give compositions having an average particle size less than about 50 microns.

I

| | Parts |
|---|---|
| N,N-diallyl 2',6'-dichlorobenzamide | 20 |
| Bentonite | 80 |
| | 100 |

| II | Parts |
|---|---|
| N,N-bis(2-choroallyl)2',3',6'-trichlorobenzamide | 8 |
| Pyrophyllite | 92 |
| | 100 |

*Example 3.—Water-dispersible powders*

The following powdered compositions are adapted for dispersing in water for application as a spray for the destruction and prevention of weeds. The powdered compositions are made by intimately mixing the listed ingredients, using conventional mixing or blending equipment, and then grinding the mixture to give a powder having an average particle size less than about 50 microns.

| I | Parts |
|---|---|
| N,N-diallyl 2',6'-dichlorobenzamide | 70 |
| Sodium disulfonate of dibutylphenyl phenol (wetting and dispersing agent) | 2 |
| Bentonite | 28 |
| | 100 |

| II | Parts |
|---|---|
| N,N-bis(2-chloroallyl)2',3',6'-trichlorobenzamide | 75 |
| Fuller's earth | 23 |
| Sodium lauryl sulfate, 50% (wetting agent) | 1.75 |
| Methyl cellulose, 15 cps. (dispersing agent) | 0.25 |
| | 100.00 |

*Example 4.—Granular compositions*

The following compositions are adapted for application by means of a fertilizer spreader apparatus or similar equipment. The compositions are readily prepared by mixing the ingredients with water to form a paste. The paste is then extruded, dried and ground to give the desired granular size. Preferably, the granules will be in the order of one thirty-second to one quarter inch in diameter.

| I | Parts |
|---|---|
| N,N-diallyl 2',6'-dichlorobenzamide | 11 |
| Goulac (dispersing agent) | 4 |
| Hydrocarbon oil | 1 |
| Dextrin (binding agent) | 19 |
| Fuller's earth | 65 |
| | 100 |

| II | Parts |
|---|---|
| N,N-bis(2-chloroallyl)2',3',6'-trichlorobenzamide | 9 |
| Goulac | 4 |
| Kerosene | 2 |
| Gelatin | 25 |
| Talc | 60 |
| | 100 |

*Example 5.—Oil-water dispersible powders*

The following powdered compositions are adapted for use in the preparation of spray compositions using either oil, water or a combination of oil and water as the liquid diluent. The powders are made by mixing and grinding as in the case of the powders of Example 2.

| I | Parts |
|---|---|
| N,N-diallyl 2',6'-dichlorobenzamide | 75 |
| Ethylene oxide stearate-laurate (emulsifying agent) | 5 |
| Pyrophyllite | 20 |
| | 100 |

| II | Parts |
|---|---|
| N,N-bis(2-chloroallyl)2'',3'',6'-trichlorobenzamide | 65 |
| Alkylated aryl polyether alcohol (wetting and dispersing agent) | 8 |
| Fuller's earth | 27 |
| | 100 |

*Example 6.—Water-dispersible liquid compositions*

The following compositions are in liquid form and are adapted to give aqueous dispersions for application as sprays. In the case of some of the benzamines, the compositions will not be complete solutions, but rather will be dispersions of solid in the solvent used. The liquid or fluid compositions shown are prepared by thoroughly mixing or dispersing the active compounds and one or more conditioning agents such as dispersing or emulsifying agents, in an organic liquid diluent.

| I | Parts |
|---|---|
| N,N-diallyl 2',6'-dichlorobenzamide | 24 |
| Long chain fatty alcohol sulfate (emulsifying agent) | 4 |
| Methyl cellulose (dispersing agent) | 3 |
| Methylethyl ketone | 69 |
| | 100 |

| II | Parts |
|---|---|
| N,N-bis(2-chloroallyl)2',3',6'-trichlorobenzamide | 38 |
| Alkylated aryl polyether alcohol (wetting and dispersing agent) | 7 |
| Methyl isobutyl ketone | 55 |
| | 100 |

While this invention has been described with respect to certain embodiments, it is not so limited, and it is to be understood that variations and modifications thereof obvious to those skilled in the art may be made without departing from the spirit of this invention.

What is claimed is:

1. A method of inhibiting the growth of undesirable plants which comprises applying to the soil a compound having the formula

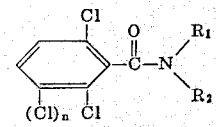

wherein $n$ is an integer of from 0 to 1 and $R_1$ and $R_2$ are each selected from the group consisting of unsaturated aliphatic and haloaliphatic hydrocarbon radicals having up to six (6) carbon atoms, in an amount which is phytotoxic to at least one undesirable plant species.

2. A method of selectively inhibiting the growth of undesirable plants which comprises applying to the soil containing both desirable and undesirable plant species a compound having the formula

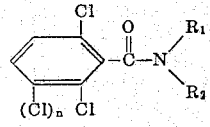

wherein $n$ is an integer of from 0 to 1 and $R_1$ and $R_2$ are alkenyl radicals having up to four (4) carbon atoms, at a rate of application which is phytotoxic to at least one of the undesirable plant species.

3. A method of claim 2 wherein the compound is N,N-diallyl-2',6'-dichlorobenzamide.

4. A method of selectively inhibiting the growth of undesirable plants which comprises applying to the soil containing desired and undesired plant species a compound having the formula

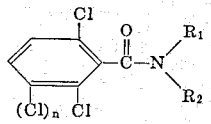

wherein $n$ is an integer of from 0 to 1 and $R_1$ and $R_2$ are haloaliphatic hydrocarbon radicals having up to four (4) carbon atoms, at a rate of application which is phytotoxic to at least one of the undesirable plant species.

5. A method of selectively inhibiting the growth of undesirable plants which comprises applying to the soil containing desired and undesired plant species a compound having the formula

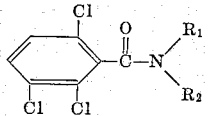

wherein $R_1$ and $R_2$ are alkenyl radicals having up to four (4) carbon atoms, at a rate of application which is phytoxic to at least one undesirable plant species.

6. A method of claim 5 wherein the compound is N,N-diallyl-2′,3′,6′-trichlorobenzamide.

7. A method of selectively inhibiting the growth of undesirable plants which comprises applying to the soil containing desired and undesired plant species a compound having the formula

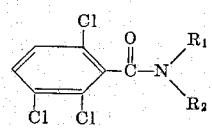

wherein $R_1$ and $R_2$ are chloroalkenyl radicals up to four (4) carbon atoms, at a rate of application which is phytoxic to at least one undesirable plant species.

8. A method of claim 7 wherein the compound is N,N-bis(2-chloroallyl)-2′,3′,6′-trichlorobenzamide.

9. A method of controlling the growth of undesirable plants which comprises applying to the soil a phytotoxic amount of a compound having the formula:

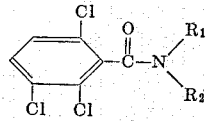

wherein $R_1$ and $R_2$ are alkenyl having from 3 to 4 carbon atoms.

10. A compound having the formula:

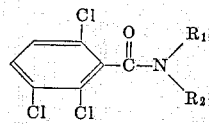

wherein $R_1$ and $R_2$ are alkenyl having from 3 to 4 carbon atoms.

References Cited

UNITED STATES PATENTS

| | | | |
|---|---|---|---|
| 2,412,510 | 12/1946 | Jones | 71—2.6 |
| 2,551,891 | 5/1951 | Martin et al. | 167—30 X |
| 2,643,965 | 6/1953 | O'Brien et al. | 167—30 |
| 2,687,403 | 8/1954 | Ballard et al. | 71—2.6 X |
| 2,848,470 | 8/1958 | Girard et al. | 71—2.6 X |
| 2,936,323 | 5/1960 | Eden | 71—2.3 |
| 3,014,965 | 12/1961 | Newcomer et al. | 71—2.6 X |
| 3,077,498 | 12/1963 | Baker et al. | 71—2.6 |
| 3,131,188 | 4/1964 | Moffett | 71—2.6 X |

OTHER REFERENCES

King: "Insecticides and Repellants," Agr. Handbook, No. 69, May 1954, pp. 58 to 63 (pp. 59 and 60 particularly relied upon).

JAMES O. THOMAS, Jr., *Primary Examiner.*

JULIAN S. LEVITT, *Examiner.*

UNITED STATES PATENT OFFICE
CERTIFICATE OF CORRECTION

Patent No. 3,357,816                     December 12, 1967

Joseph W. Baker et al.

It is hereby certified that error appears in the above numbered patent requiring correction and that the said Letters Patent should read as corrected below.

Column 2, line 18, for "in" read -- is --; same line 18, for "posses" read -- possess --; column 9, line 25, for "phytoxic" read -- phytotoxic --; line 39, after "radicals" insert -- having --.

Signed and sealed this 11th day of March 1969.

(SEAL)
Attest:

Edward M. Fletcher, Jr.
Attesting Officer

EDWARD J. BRENNER
Commissioner of Patents